United States Patent
Chen et al.

(10) Patent No.: US 10,735,055 B2
(45) Date of Patent: Aug. 4, 2020

(54) METHOD AND DEVICE FOR REDUCING COMPLEXITY OF CHANNEL QUANTIZATION

(71) Applicant: ZTE CORPORATION, Shenzhen (CN)

(72) Inventors: Yijian Chen, Shenzhen (CN); Yu Ngok Li, Shenzhen (CN); Zhaohua Lu, Shenzhen (CN); Huahua Xiao, Shenzhen (CN); Jianxing Cai, Shenzhen (CN); Hao Wu, Shenzhen (CN); Yong Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/075,320

(22) PCT Filed: Jan. 23, 2017

(86) PCT No.: PCT/CN2017/072255
§ 371 (c)(1),
(2) Date: Aug. 3, 2018

(87) PCT Pub. No.: WO2017/133549
PCT Pub. Date: Aug. 10, 2017

(65) Prior Publication Data
US 2019/0068252 A1   Feb. 28, 2019

(30) Foreign Application Priority Data
Feb. 5, 2016   (CN) .......................... 2016 1 0082766

(51) Int. Cl.
*H04B 7/0417* (2017.01)
*H04L 5/00* (2006.01)
(Continued)

(52) U.S. Cl.
CPC ......... *H04B 7/0417* (2013.01); *H04B 7/0456* (2013.01); *H04B 7/0647* (2013.01);
(Continued)

(58) Field of Classification Search
CPC .. H04B 7/0417; H04B 7/0647; H04B 7/0456; H04B 7/0482; H04B 7/0626;
(Continued)

(56) References Cited

U.S. PATENT DOCUMENTS

| 9,271,279 B2 | 2/2016 | Khoshnevis et al. |
| 2014/0334391 A1 | 11/2014 | Khoshnevis et al. |

(Continued)

FOREIGN PATENT DOCUMENTS

| CN | 102036376 A | 4/2011 |
| CN | 103716818 A | 4/2014 |
| CN | 104935389 A | 9/2015 |

OTHER PUBLICATIONS

International Search Report in international application No. PCT/CN2017/072255, dated Mar. 28, 2017, 2 pgs.
(Continued)

*Primary Examiner* — Fitwi Y Hailegiorgis
(74) *Attorney, Agent, or Firm* — Cooper Legal Group, LLC (57) ABSTRACT

Embodiments of the present invention provide a method and device for reducing complexity of channel quantization. The method comprises: determining, on the basis of whether a measurement feedback parameter configured by a channel state information (CSI) process satisfies a predetermined condition, a CSI report time-domain position and a time interval requirement parameter Nrpt-ref for a CSI reference resource time-domain position, or determining a CSI trigger time-domain position and a time interval requirement parameter Nrpt-ref for a CSI reference resource time-do-
(Continued)

main position; determining, according to the determined time interval requirement parameter Nrpt-ref and the CSI report time-domain position, the CSI reference resource time-domain position, or determining, according to the determined time interval requirement parameter Nrpt-ref and the CSI trigger time-domain position, the CSI reference resource time-domain position; and performing CSI quantization according to the determined CSI reference resource time-domain position.

17 Claims, 4 Drawing Sheets

(51) Int. Cl.
    *H04B 7/06*     (2006.01)
    *H04B 7/0456*     (2017.01)
    *H04W 72/04*     (2009.01)
    *H04L 25/02*     (2006.01)
    *H04L 5/14*     (2006.01)

(52) U.S. Cl.
    CPC ............ *H04L 5/005* (2013.01); *H04L 5/0057* (2013.01); *H04W 72/048* (2013.01); *H04W 72/0446* (2013.01); *H04B 7/0482* (2013.01); *H04B 7/0626* (2013.01); *H04L 5/0007* (2013.01); *H04L 5/14* (2013.01); *H04L 25/0202* (2013.01)

(58) Field of Classification Search
    CPC ... H04L 25/0202; H04L 5/0057; H04L 5/005; H04L 5/0007; H04L 5/14; H04W 72/048; H04W 72/0446
    USPC .................................................. 375/260, 267
    See application file for complete search history.

(56) References Cited

U.S. PATENT DOCUMENTS

| | | |
|---|---|---|
| 2016/0174096 A1 | 6/2016 | Khoshnevis et al. |
| 2016/0359538 A1* | 12/2016 | Onggosanusi ....... H04B 7/0469 |
| 2017/0034727 A1 | 2/2017 | Li et al. |
| 2017/0170940 A1* | 6/2017 | Lee ....................... H04L 5/0048 |

OTHER PUBLICATIONS

English Translation of the Written Opinion of the International Search Authority in international application No. PCT/CN2017/072255, dated Mar. 28, 2017, 4 pgs.

* cited by examiner

METHOD AND DEVICE FOR REDUCING COMPLEXITY OF CHANNEL QUANTIZATION

TECHNICAL FIELD

The present disclosure relates, but not limited, to the field of mobile communications, and in particular to a method and device for reducing complexity of channel quantization.

BACKGROUND

In a wireless communication system, a sending end and a receiving end usually use multiple antennas to send and receive, so as to get a higher rate. A principle of multi-antenna technology is using some characteristics of a channel to form multi-layer transmissions matching the characteristics of the channel. Through the multi-antenna technology, a radiation direction of a signal is highly targeted, which can improve system performance effectively. A significant performance improvement is achieved without increasing bandwidth and power. Therefore, the multi-antenna technology is a very promising technology and widely applied in current systems. Data transmission performance of a multi-antenna system mainly depends on measurement and feedback of channel information, so the measurement and feedback of channel information is the core of the multi-antenna technology. How to ensure accuracy, overhead and robustness of channel measurement and channel information feedback becomes an important problem.

Basic contents related to Channel State Information (CSI) in a Long Term Evolution (LTE) system are as follows.

The basic contents include the content of CSI feedback. Implicit CSI feedback generally includes Channel Quality Indication (CQI), Precoding Matrix Indicator (PMI) and Rank Indicator (RI). The CQI is an indicator for measuring the quality of a downlink channel. In a protocol 36-213, the CQI is represented by integer values from 0 to 15, respectively representing different CQI levels; and different CQIs correspond to their respective Modulation and Coding Schemes (MCS) and encoding rates. The RI is used for describing the number of independent spatial channels, corresponding the rank of a channel response matrix. In an open-loop spatial multiplexing mode and a closed-loop spatial multiplexing mode, a piece of User Equipment (UE) is required to feedback RI information. In other modes, there is no need to feed back the RI information. The rank of the channel response matrix corresponds to the number of layers. The PMI feeds back the best precoding information, which indicates, based on an index feedback, a code word best matching the characteristic of the current channel in an agreed codebook.

The basic contents also include two modes of CSI feedback. There are mainly two modes of CSI feedback of a terminal. A base station may configure the terminal to measure and quantize the channel information, and periodically feedback the quantized CSI (including the RI, the PMI, and the CQI) through a Physical Uplink Control Channel (PUCCH). The base station may also trigger, if needed, the terminal to report the CSI (including the RI, the PMI, and the CQI) aperiodically and unexpectedly, so as to overcome the problem that real-time performance of periodical feedback is modest and CSI quantization accuracy is limited to the control of channel overhead.

The basic contents also include a CSI process. The 3GPP introduces a concept of CSI process. The base station may configure multiple CSI processes for the terminal. Each CSI process is equivalent to a CSI measurement and feedback process. Each CSI process is independent from other CSI processes, and parameters are configured separately. One process is supported in a transmission mode 9, and at most four processes may be supported in a transmission mode 10. The configuration of channel measurement part and the configuration of interference measurement part and feedback mode are defined in the configuration of each CSI process.

The basic contents also include a feedback class. The design of the measurement and feedback of the CSI is comparatively simple in an early LTE system version. Early CSI feedback only supports the configuration of a small set of pilot ports (2, 4, 8) and low-dimensional feedback, wherein all the pilot ports are non-precoding pilot. However, with the number of antennas is increasing and an accuracy requirement gets higher and higher, the deployment of the base station becomes more and more diverse, so a pilot overhead, a feedback overhead and complexity of feedback quantization increase significantly. A new definition of CSI feedback class is introduced in a new LTE version. There are two specific feedback classes, which are respectively class A and class B. The base station may configure the feedback class for each CSI process. The class A supports a high-dimensional 2D antenna topology (supporting more than eight ports), and the feedback is based on high-dimensional non-precoding pilot measurement, and uses the high-accuracy codebook. The class B supports the configuration of multiple precoding CSI Reference Signals (CSI-RSs) to perform beam selection (the number of pilots is greater than 1, and the total number of ports may be greater than 8), in such case, the CSI-RS sent by the base station is generally a precoding pilot; the UE may need to first perform precoding pilot selection or resource selection of the precoding pilot, and then perform, based on a selected CSI-RS resource, quantization feedback of the channel information, including resource selection information CSI-RS Resource Index (CRI) and the RI, PMI and CQI corresponding to the selected CSI-RS resource.

For some new feedback classes introduced, a pilot dimension corresponding to the feedback of class A is usually high, and more than eight ports, so complexity of channel estimation will increase exponentially; at the same time, a codebook dimension used in the process of channel quantization is large, the number of code words increases by several times compared with the previous number code words, so complexity of code word selection will be very high. The class B needs to perform channel measurement and interference measurement to multiple pilots, and needs to perform performance comparison after quantization to the channel information of multiple pilots, so complexity is also very high. Therefore, both the feedback of class A and the feedback of class B bring a big challenge to implementation complexity and cost of the terminal.

SUMMARY

The following is an overview of the theme elaborated in this application. The overview is not intended to limit the scope of protection of the claims.

The present disclosure provides a method and device for reducing complexity of channel quantization, which may ensure to reduce complexity of the terminal without a significant performance loss.

The method for reducing complexity of channel quantization, which is provided by the disclosure and applied to the terminal, includes following actions.

A CSI report time-domain position and a time interval requirement parameter $N_{rpt-ref}$ for a CSI reference resource time-domain position are determined according to whether a measurement feedback parameter configured by a CSI process satisfies a first predetermined condition. Or a CSI trigger time-domain position and an interval condition requirement parameter $N_{trg-ref}$ for the CSI reference resource time-domain position are determined according to whether the measurement feedback parameter configured by the CSI process satisfies a second predetermined condition.

The CSI reference resource time-domain position is determined according to the determined time interval requirement parameter $N_{rpt-ref}$ and CSI report time-domain position. Or the CSI reference resource time-domain position is determined according to the determined interval condition requirement parameter $N_{trg-ref}$ and CSI trigger time-domain position.

CSI quantization is performed according to the determined CSI reference resource time-domain position.

According to an embodiment, the predetermined conditions include one of the followings:
a feedback mode configured by the CSI process, belongs to a set of feedback modes S1;
a codebook parameter configured by the CSI process, belongs to a set of codebook parameters S2;
a total number of ports for measuring the pilot, which is configured by the CSI process, belongs to a set of numbers of ports S3; or a number of pilots K configured by the CSI process, belongs to a set of numbers of pilots S4.

According to an embodiment, after the CSI quantization is performed, the method further includes following action. The quantized CSI is fed back.

According to an embodiment, before the time interval requirement parameter $N_{rpt-ref}$ or the interval condition requirement parameter $N_{trg-ref}$ is determined, the method further includes the following actions. According to a capability level of the terminal, or a duplex mode, or a frame structure type, or PMI enabling signaling, or a configured transmission mode, or the number of configured processes, or the number of triggered processes, or a configured feedback class, one of the followings is determined:
the feedback mode included in the set of feedback modes S1;
the codebook parameter included in the set of codebook parameters S2;
the number of ports included in the set of the numbers of ports S3; or
the number of pilots included in the set of the numbers of pilots S4.

According to an embodiment, when multiple processes are configured or triggered, the set of the numbers of ports S3 is an union of the sets of the total number of ports for measuring the pilot corresponding to the multiple processes.

According to an embodiment, when multiple processes are configured or triggered, the set of the numbers of pilots S4 is an union of the sets of the number of pilots corresponding to the multiple processes.

According to an embodiment, when the configured number of pilots K is less than 4, the time interval requirement parameter $N_{rpt-ref}$ is x. When the configured number of pilots K is greater than or equal to 4, the time interval requirement parameter $N_{rpt-ref}$ is y. The x and the y are integers, and the y is greater than x.

The disclosure also provides a device for reducing complexity of channel quantization, which is set in the terminal, and includes a first determining module 21, a second determining module 22 and a quantization module 23.

The first determining module 21 is configured to determine the CSI report time-domain position and the time interval requirement parameter $N_{rpt-ref}$ for the CSI reference resource time-domain position according to whether the measurement feedback parameter configured by the CSI process satisfies the first predetermined condition, or determine the CSI trigger time-domain position and the interval condition requirement parameter $N_{trg-ref}$ for the CSI reference resource time-domain position according to whether the measurement feedback parameter configured by the CSI process satisfies the second predetermined condition.

The second determining module 22 is configured to determine the CSI reference resource time-domain position according to the determined time interval requirement parameter $N_{rpt-ref}$ and CSI report time-domain position, or determine the CSI reference resource time-domain position according to the determined interval condition requirement parameter $N_{trg-ref}$ and CSI trigger time-domain position.

The quantization module 23 is configured to perform the CSI quantization according to the determined CSI reference resource time-domain position.

According to an embodiment, the device further includes: a feedback module 24, which is configured to feed back the quantized CSI.

According to an embodiment, the device further includes: a setting module 25, which is configured to determine, according to the capability level of the terminal, or the duplex mode, or the frame structure type, or the PMI enabling signaling, or the configured transmission mode, or the number of configured processes, or the number of triggered processes, or the configured feedback class, one of the followings:
a feedback mode included in a set of feedback modes S1;
a codebook parameter included in a set of codebook parameters S2;
a number of ports included in a set of numbers of ports S3; or
a number of pilots included in a set of numbers of pilots S4.

According to an embodiment, the setting module 25 is further configured to, when multiple processes are configured or triggered, determine that the set of the numbers of ports S3 is an union of the sets of the total number of ports for measuring the pilot corresponding to the multiple processes.

According to an embodiment, the setting module 25 is further configured to, when multiple processes are configured or triggered, determine that the set of the numbers of pilots S4 is an union of the sets of the number of pilots corresponding to the multiple processes.

The disclosure also provides a computer readable storage medium, in which computable executable instructions are stored. The computable executable instructions are used for performing the above method.

A solution provided by the disclosure achieves an optimal tradeoff between the performance loss and complexity according to the current conditions; through the solution, there is no significant performance loss while a benefit of complexity reduction is obtained, and the complexity of terminal is reduced, thereby reducing the cost of the terminal indirectly.

Other aspects can be understood after the accompanying drawings and detailed descriptions are read and understood.

DETAILED DESCRIPTION

Embodiments of the present disclosure are elaborated below in combination with the accompanying drawings. It is to be noted that the embodiments and the features in the embodiments of the application can be combined with each other under the condition of no conflicts.

Embodiment 1

Figure 1:
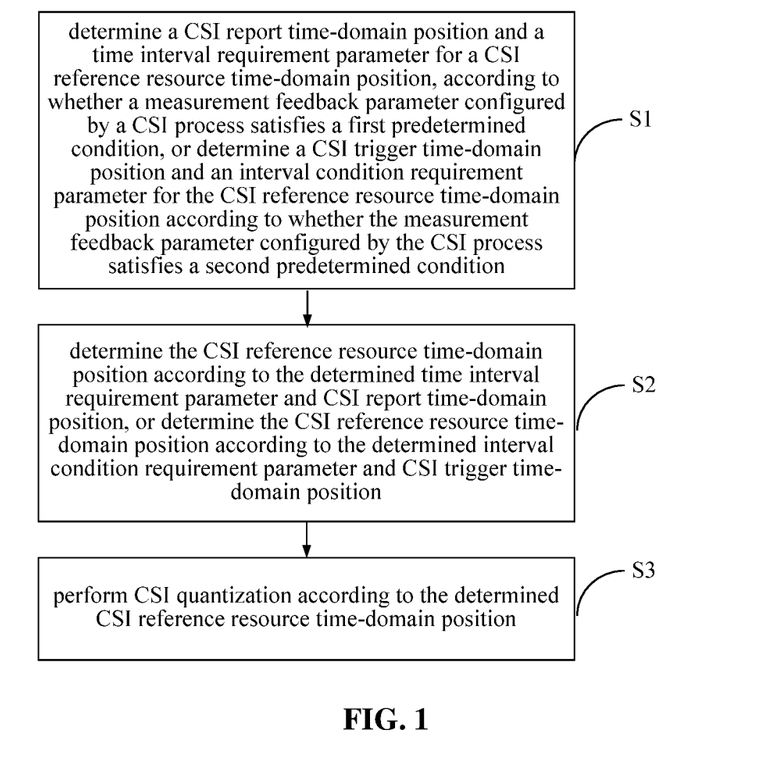
FIG. 1 illustrates a flowchart of a method for reducing complexity of channel quantization according to embodiment 1 of the disclosure.

As shown in FIG. 1, the embodiment of the disclosure provides a method for reducing complexity of channel quantization, which is applied to the terminal and includes the following steps.

At S1, the CSI report time-domain position and the time interval requirement parameter $N_{rpt-ref}$ for the CSI reference resource time-domain position are determined according to whether the measurement feedback parameter configured by the CSI process satisfies the first predetermined condition, or the CSI trigger time-domain position and the interval condition requirement parameter $N_{trg-ref}$ for the CSI reference resource time-domain position are determined according to whether the measurement feedback parameter configured by the CSI process satisfies the second predetermined condition.

At S2, the CSI reference resource time-domain position is determined according to the determined time interval requirement parameter $N_{rpt-ref}$ and CSI report time-domain position, or the CSI reference resource time-domain position is determined according to the determined interval condition requirement parameter $N_{trg-ref}$ and CSI trigger time-domain position.

At S3, the CSI quantization is performed according to the determined CSI reference resource time-domain position.

According to an embodiment, the predetermined conditions include one of the followings:

the feedback mode configured by the CSI process, belongs to the set of feedback modes S1;

the codebook parameter configured by the CSI process, belongs to the set of codebook parameters S2;

the total number of ports for measuring the pilot, which is configured by the CSI process, belongs to the set of the numbers of ports S3; or the number of pilots K configured by the CSI process, belongs to the set of the numbers of pilots S4.

Both the first predetermined condition and the second predetermined condition may be selected from the above scope. The first predetermined condition and the second predetermined condition may be the same or different.

According to an embodiment, after the CSI quantization is performed, the method further includes that: the quantized CSI is fed back.

According to an embodiment, before the time interval requirement parameter $N_{rpt-ref}$ or the interval condition requirement parameter $N_{trg-ref}$ is determined, the method further includes the following steps. According to the capability level of the terminal, or the duplex mode, or the frame structure type, or the PMI enabling signaling, or the configured transmission mode, or the number of configured processes, or the number of triggered processes, or the configured feedback class, one of the followings is determined:

the feedback mode included in the set of feedback modes S1;

the codebook parameter included in the set of codebook parameters S2;

the number of ports included in the set of the numbers of ports S3; or the number of pilots included in the set of the numbers of pilots S4.

According to an embodiment, when multiple processes are configured or triggered, the set of the numbers of ports S3 is an union of the sets of the total number of ports for measuring the pilot corresponding to the multiple processes.

According to an embodiment, when multiple processes are configured or triggered, the set of the numbers of pilots S4 is an union of the sets of the number of pilots corresponding to the multiple processes.

According to an embodiment, when the configured number of pilots K is less than 4, the time interval requirement parameter $N_{rpt-ref}$ is x. When the configured number of pilots K is greater than or equal to 4, the time interval requirement parameter $N_{rpt-ref}$ is y. The x and the y are integers, and the y is greater than x.

Embodiment 2

Figure 2:
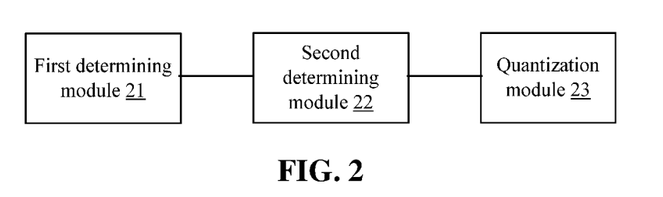
FIG. 2 illustrates a structure diagram of a device for reducing complexity of channel quantization according to embodiment 2 of the disclosure.

As shown in FIG. 2, the embodiment provides a device for reducing complexity of channel quantization, which is set in the terminal and includes a first determining module 21, a second determining module 22 and the quantization module 23.

The first determining module 21 is configured to determine the CSI report time-domain position and the time interval requirement parameter $N_{rpt-ref}$ for the CSI reference resource time-domain position according to whether the measurement feedback parameter configured by the CSI process satisfies the first predetermined condition, or determine the CSI trigger time-domain position and the interval condition requirement parameter $N_{trg-ref}$ for the CSI reference resource time-domain position according to whether the measurement feedback parameter configured by the CSI process satisfies the second predetermined condition.

The second determining module 22 is configured to determine the CSI reference resource time-domain position according to the determined time interval requirement parameter $N_{rpt-ref}$ and CSI report time-domain position, or determine the CSI reference resource time-domain position according to the determined interval condition requirement parameter $N_{trg-ref}$ and CSI trigger time-domain position.

The quantization module 23 is configured to perform the CSI quantization according to the determined CSI reference resource time-domain position.

Figure 3:
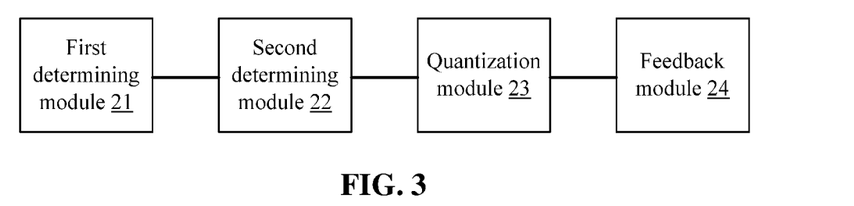
FIG. 3 illustrates a structure diagram of another device for reducing complexity of channel quantization according to embodiment 2 of the disclosure.

According to an embodiment, as illustrated in FIG. 3, the device further includes a feedback module 24 configured to feed back the quantized CSI.

Figure 4:
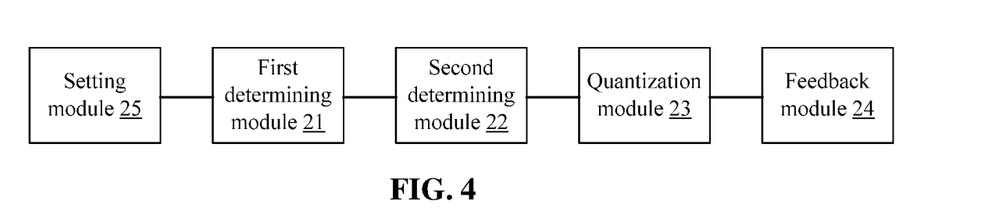
FIG. 4 illustrates a structure diagram of another device for reducing complexity of channel quantization according to embodiment 2 of the disclosure.

According to an embodiment, as illustrated in FIG. 4, the device further includes a setting module 25. The setting module 25 is configured to determine, according to the capability level of the terminal, or the duplex mode, or the frame structure type, or the PMI enabling signaling, or the configured transmission mode, or the number of configured processes, or the number of triggered processes, or the configured feedback class, one of the followings:

the feedback mode included in the set of feedback modes S1;

the codebook parameter included in the set of codebook parameters S2;

the number of ports included in the set of the numbers of ports S3; or the number of pilots included in the set of the numbers of pilots S4.

According to an embodiment, the setting module 25 is further configured to, when multiple processes are configured or triggered, determine that the set of the numbers of ports S3 is an union of the sets of the total number of ports for measuring the pilot corresponding to the multiple processes.

According to an embodiment, the setting module 25 is further configured to, when multiple processes are configured or triggered, determine that the set of the numbers of pilots S4 is an union of the sets of the number of pilots corresponding to the multiple processes.

An illustration is given below through several application embodiments.

Application Embodiment 1

In a Multiple Input Multiple Output (MIMO) system, a flow that the terminal measures and feeds back the CSI includes the following steps.

At S101, the terminal determines whether it is needed to report the CSI periodically or aperiodically. If there is the CSI needing to be reported, S102 is performed. If not, the flow is ended.

At S102, the terminal determines the class of the CSI needing to be fed back and a position of reporting the CSI.

The periodical CSI generally does not need extra dynamic trigger signaling, but the aperiodical CSI needs to be triggered in downlink control signaling. After trigger, the terminal performs CSI calculation, and reports the CSI after some subframes.

There are many CSI classes, mainly including the RI, the PMI, the CQI and the CRI.

The CSI feedback class is generally determined according to the CSI process and its corresponding feedback mode, and the feedback mode defines a combination of the CSI (the CQI, the PMI, and the RI) feedback classes. In the embodiment, the CSI feedback class is determined by a feedback granularity, a feedback position and feedback content. Herein, an aperiodical feedback is transmitted on a Physical Uplink Shared Channel (PUSCH), including the mode shown in Table 1. A periodical feedback mode is the mode periodically performing feedback on a Physical Uplink Control Channel (PUCCH), including the mode shown in Table 2.

TABLE 1

| | | PMI feedback class | | |
|---|---|---|---|---|
| | | No PMI | Single PMI | Multiple PMIs |
| PUSCH CQI feedback class | Broadband (broadband CQI) | | | Mode 1-2 |
| | UE selection (sub-band CQI) | Mode 2-0 | | Mode 2-2 |
| | High-level configuration (sub-band CQI) | Mode 3-0 | Mode 3-1 | Mode 3-2 |

TABLE 2

| | | PMI feedback class | |
|---|---|---|---|
| | | No PMI | Single PMI |
| PUCCH CQI Feedback class | Broadband (broadband CQI) | Mode 1-0 | Mode 1-1 |
| | UE selection (sub-band CQI) | Mode 2-0 | Mode 2-1 |

The above feedback modes define the content of the CSI needing to be fed back by the terminal, referring to the LTE physical layer protocol specification TS 36.213. The feedback modes which can be configured in different transmission modes are not completely the same, and each transmission mode corresponds to a candidate set of feedback modes which can be configured.

At S103, the terminal determines a reference resource corresponding to this CSI feedback.

Generally, the reference resource is a reference object of the CSI quantization, and a reference resource position may be comparatively fixed, and has a certain relationship with the position of reporting the CSI (the $N_{rpt}$ subframe) or a position of triggering the CSI $N_{trg}$ (corresponding to an aperiodical CSI report). For example, when a single CSI process is configured, the reference resource position is the subframe satisfying the following conditions:

condition 1: the subframe is at the $(N_{rpt}-N_{rpt-ref})$th subframe or before it;

condition 2: the subframe is valid (the definition about the subframe is valid may refer to the protocol TS 36.213 of the 3GPP);

condition 3: the subframe is nearest to the position of reporting the CSI when the other conditions are satisfied;

$N_{rpt-ref}$=m, and the m is greater than 0; for example, it may be 8; a frequency-domain position is some Resource Blocks (RB) or subbands corresponding to the CSI.

If it is the aperiodical feedback, the reference resource position may also be the subframe satisfying the following conditions:

condition 4: the subframe is at the $(N_{trg}-N_{trg-ref})$th subframe or before it;

condition 5: the subframe is valid (the definition about the subframe is valid may refer to the protocol TS 36.213 of the 3GPP);

condition 6: the subframe is nearest to the position of triggering the CSI when the other conditions are satisfied;

$N_{trg-ref}$=n, and the n is an integer; for example, it may be 4.

At S104, the terminal may perform a channel estimation, PMI quantization, a CQI calculation, and a rank calculation of a channel after determining the reference resource position of the CSI; if there are multiple CSI-RSs configured, the terminal may perform a CSI-RS selection, and report selected CRI information to the base station.

In the above process, when a value of the $N_{rpt-ref}$ or the $N_{trg-ref}$ is determined according to different conditions, the $N_{rpt-ref}$ or the $N_{trg-ref}$ may be set to a fixed value; that is, for many cases, there are multiple corresponding fixed values.

Application Embodiment 2

At S201, the base station configures the feedback of class A or the feedback of class B for the terminal, and sets two values of the $N_{rpt-ref}$, that is, the $N_{rpt-ref}$ is equal to m1 and m2; or the base station sets two values of the $N_{trg-ref}$, that is, the $N_{trg-ref}$ is equal to n1 and n2.

At S202, the terminal determines whether the following condition is satisfied; when the condition is satisfied, the terminal determines that the value of the $N_{rpt-ref}$ is m1; when the condition is not satisfied, the terminal determines that the value of the $N_{rpt-ref}$ is m2; or, when the condition is satisfied, the terminal determines that the value of the $N_{trg-ref}$ is n1, and when the condition is not satisfied, the terminal determines that the value of the $N_{trg-ref}$ is n2.

In the embodiment, the condition is set as the feedback mode configured by the CSI process belongs to the set of feedback modes S1 agreed with the base station.

Herein, the S1 is a set; for example, it may be {Mode 3-2}, or {Mode 3-1, Mode 3-2}, or {Mode 1-2, Mode 3-2}, or {Mode 3-1, Mode 1-2, Mode 3-2}, and so on.

According to an embodiment, the S1 may be an agreed fixed set.

According to an embodiment, the S1 may also be determined according to the capability level of the terminal, and the terminals with different capability levels correspond to different sets S1. For example, for the terminal with high capability level, the set S1 may be set to a null set, that is, this terminal may work according to the value of the $N_{rpt-ref}$ being m2 or the value of the $N_{trg-ref}$ being n2 anytime.

According to an embodiment, the S1 may also be determined by the terminal according to the duplex mode, or the frame structure type, or the PMI enabling signaling. The sets S1 corresponding to the different duplex modes may be different, the sets S1 corresponding to the different frame structure types may be different, and the sets S1 corresponding to enabling or disabling PMI configuration may be different.

According to an embodiment, the S1 may also be determined according to the number of the CSI processes. The sets S1 corresponding to a situation of one CSI process and a situation of multiple CSI processes may be different.

According to an embodiment, the S1 may also be determined according to the transmission mode. The sets S1 corresponding to the different transmission modes may be different.

According to an embodiment, the S1 may also be determined according to the class. The sets S1 respectively corresponding to the class A, the class B and a situation where the class is not configured may be different.

At S203, after determining the values of the $N_{rpt-ref}$ and the $N_{trg-ref}$, the terminal may determine the CSI reference resource time-domain position according to the determined $N_{rpt-ref}$ and CSI report time-domain position, or determine the CSI reference resource time-domain position according to the determined $N_{trg-ref}$ and CSI trigger time-domain position.

At S204, the CSI quantization and feedback is performed according to the determined CSI reference resource time-domain position.

Application Embodiment 3

At S301, the base station configures the feedback of class A or the feedback of class B corresponding to multiple pilots for the terminal, and sets two values of the $N_{rpt-ref}$, that is, the $N_{rpt-ref}$ is equal to m1 and m2; or the base station sets two values of the $N_{trg-ref}$, that is, the $N_{trg-ref}$ is equal to n1 and n2.

At S302, the terminal determines whether the following condition is satisfied; when the condition is satisfied, the terminal determines that the value of the $N_{rpt-ref}$ is m1; when the condition is not satisfied, the terminal determines that the value of the $N_{rpt-ref}$ is m2; or, when the condition is satisfied, the terminal determines that the value of the $N_{trg-ref}$ is n1, and when the condition is not satisfied, the terminal determines that the value of the $N_{trg-ref}$ is n2.

In the embodiment, the condition is set as the codebook parameter configured by the CSI process belongs to the set of codebook parameters S2 agreed with the base station.

Herein, the codebook parameters mainly include the following parameters:

a first dimension N1, a second dimension N2, a first dimensional vector density O1, a second dimensional vector density O2, a sub-codebook selection, and a parameter about a limit to the number of code words.

Herein, the S2 is a set; for example, it may be {all codebooks that N1*N2 is configured to be greater than 8}, or {all possible codebooks that N1*N2*O1*O2 is configured to be greater than or equal to 32}, or {all possible codebooks that N1*N2*O1*O2 is configured to be greater than or equal to 32 and the sub-codebook selection is 2, 3, 4}, or {all codebooks that the total number of code words is greater than 256}.

According to an embodiment, the S2 may be an agreed fixed set.

According to an embodiment, the S2 may also be determined according to the capability level of the terminal, and the terminals with different capability levels correspond to different sets S2. For example, for the terminal with high capability level, the set S2 may be set to the null set, that is, this terminal may work according to the value of the $N_{rpt-ref}$ being m2 or the value of the $N_{trg-ref}$ being n2 anytime.

According to an embodiment, the S2 may also be determined by the terminal according to the duplex mode, or the frame structure type, or the PMI enabling signaling. The sets S2 corresponding to the different duplex modes may be different, the sets S2 corresponding to the different frame structure types may be different, and the sets S2 corresponding to enabling or disabling PMI configuration may be different.

According to an embodiment, the S2 may also be determined according to the number of the CSI processes. The sets S2 corresponding to the situation of one CSI process and the situation of multiple CSI processes may be different.

According to an embodiment, the S2 may also be determined according to the transmission mode. The sets S2 corresponding to the different transmission modes may be different.

According to an embodiment, the S2 may also be determined according to the class. The sets S2 respectively corresponding to the class A and the class B may be different.

At S303, after determining the values of the $N_{rpt-ref}$ and the $N_{trg-ref}$, the terminal may determine the CSI reference resource time-domain position according to the determined $N_{rpt-ref}$ and CSI report time-domain position, or determine the CSI reference resource time-domain position according to the determined $N_{trg-ref}$ and CSI trigger time-domain position.

At S304, the CSI quantization and feedback is performed according to the determined CSI reference resource time-domain position.

Application Embodiment 4

At S401, the base station configures the feedback of class A or the feedback of class B for the terminal, and sets two values of the $N_{rpt-ref}$, that is, the $N_{rpt-ref}$ is equal to m1 and m2; or the base station sets two values of the $N_{trg-ref}$, that is, the $N_{trg-ref}$ is equal to n1 and n2.

At S402, the terminal determines whether the following condition is satisfied; when the condition is satisfied, the terminal determines that the value of the $N_{rpt-ref}$ is m1; when the condition is not satisfied, the terminal determines that the value of the $N_{rpt-ref}$ is m2; or, when the condition is satisfied, the terminal determines that the value of the $N_{trg-ref}$ is n1, and when the condition is not satisfied, the terminal determines that the value of the $N_{trg-ref}$ is n2.

In the embodiment, the condition is set as the total number of ports for measuring the pilot belongs to the set of the numbers of ports S3 agreed with the base station.

Herein, the S3 may be, for example, {the number of configurable ports being greater than 8}, or {the number of configurable ports being greater than or equal to 8}, or {the number of configurable ports being greater than 12}, or {the number of configurable ports being greater than or equal to 12}, or {the number of configurable ports being greater than 16}, or {the number of configurable ports being greater than or equal to 16}.

According to an embodiment, if a process is configured or triggered, the total number of ports for measuring the pilot of the process is counted.

According to an embodiment, if many processes are configured or triggered, the total number of ports for measuring the pilot of the multiple processes is counted jointly.

According to an embodiment, the S3 may be an agreed fixed set.

According to an embodiment, the S3 may also be determined according to the capability level of the terminal, and the terminals with different capability levels correspond to different sets S3. For example, for the terminal with high capability level, the set S3 may be set to the null set, that is, this terminal may work according to the value of the $N_{rpt-ref}$ being m2 or the value of the $N_{trg-ref}$ being n2 anytime.

According to an embodiment, the S3 may be determined by the terminal according to the duplex mode, or the frame structure type, or the PMI enabling signaling. The sets S3 corresponding to the different duplex modes may be different, the sets S3 corresponding to the different frame structure types may be different, and the sets S3 corresponding to enabling or disabling PMI configuration may be different.

According to an embodiment, the S3 may also be determined according to the number of the CSI processes. The sets S3 corresponding to the situation of one CSI process and the situation of multiple CSI processes may be different.

According to an embodiment, the S3 may also be determined according to the class. The sets S3 respectively corresponding to the class A and the class B may be different.

According to an embodiment, the S3 may also be determined according to the transmission mode. The sets S3 corresponding to the different transmission modes may be different.

At S403, after determining the values of the $N_{rpt-ref}$ and the $N_{trg-ref}$, the terminal may determine the CSI reference resource time-domain position according to the determined $N_{rpt-ref}$ and CSI report time-domain position, or determine the CSI reference resource time-domain position according to the determined $N_{trg-ref}$ and CSI trigger time-domain position.

At S404, the CSI quantization and feedback is performed according to the determined CSI reference resource time-domain position.

Application Embodiment 5

At S501, the base station configures the feedback of class A or the feedback of class B for the terminal, and sets two values of the $N_{rpt-ref}$, that is, the $N_{rpt-ref}$ is equal to m1 and m2; or the base station sets two values of the $N_{trg-ref}$, that is, the $N_{trg-ref}$ is equal to n1 and n2.

At S502, the terminal determines whether the following condition is satisfied; when the condition is satisfied, the terminal determines that the value of the $N_{rpt-ref}$ is m1; when the condition is not satisfied, the terminal determines that the value of the $N_{rpt-ref}$ is m2; or, when the condition is satisfied, the terminal determines that the value of the $N_{trg-ref}$ is n1, and when the condition is not satisfied, the terminal determines that the value of the $N_{trg-ref}$ is n2, wherein the n2 is greater than the n1, or the n2 is less than the n1.

In the embodiment, the condition is set as the number of pilots K belongs to the set of the numbers of pilots S4 agreed with the base station.

Herein, the S4 may be, for example, {numbers greater than 4}, or {numbers greater than or equal to 4}, or {numbers greater than 2}.

According to an embodiment, if a process is configured or triggered, the number of pilots of the process is counted.

According to an embodiment, if many processes are configured or triggered, the number of pilots of the multiple processes is counted jointly.

According to an embodiment, the S4 may be an agreed fixed set.

According to an embodiment, the S4 may also be determined according to the capability level of the terminal, and the terminals with different capability levels correspond to different sets S4. For example, for the terminal with high capability level, the set S4 may be set to the null set, that is, this terminal may work according to the value of the $N_{rpt-ref}$ being m2 or the value of the $N_{trg-ref}$ being n2 anytime.

According to an embodiment, the S4 may also be determined by the terminal according to the duplex mode, or the frame structure type, or the PMI enabling signaling. The sets S4 corresponding to the different duplex modes may be different, the sets S4 corresponding to the different frame structure types may be different, and the sets S4 corresponding to enabling or disabling PMI configuration may be different.

According to an embodiment, the S4 may also be determined according to the number of the CSI processes. The sets S4 corresponding to the situation of one CSI process and the situation of multiple CSI processes may be different.

According to an embodiment, the S4 may also be determined according to the transmission mode. The sets S4 corresponding to the different transmission modes may be different.

According to an embodiment, the S4 may also be determined according to the class. The sets S4 respectively corresponding to the class A and the class B may be different.

At S503, after determining the values of the $N_{rpt-ref}$ and the $N_{trg-ref}$, the terminal may determine the CSI reference resource time-domain position according to the determined $N_{rpt-ref}$ and CSI report time-domain position, or determine the CSI reference resource time-domain position according to the determined $N_{trg-ref}$ and CSI trigger time-domain position.

At S504, the CSI quantization and feedback is performed according to the determined CSI reference resource time-domain position.

Application Example 6

In the above application examples, determining conditions may be set jointly; for example, the following conditions need to be satisfied simultaneously:

the feedback mode configured by the CSI process belongs to the set of feedback modes S1 agreed with the base station and the codebook parameter configured by the CSI process belongs to the set of codebook parameters S2 agreed with the base station; or the feedback mode configured by the CSI process belongs to the set of feedback modes S1 agreed with the base station and the total number of ports for measuring the pilot configured by the CSI process belongs to the set of the numbers of ports S3 agreed with the base station; or the feedback mode configured by the CSI process belongs to the set of feedback modes S1 agreed with the base station and the number of pilots K configured by the CSI process belongs to the set of the numbers of pilots S4 agreed with the base station; or the total number of ports for measuring the pilot configured by the CSI process belongs to the set of the numbers of ports S3 agreed with the base station and the number of pilots K configured by the CSI process belongs to the set of the numbers of pilots S4 agreed with the base station.

The embodiments of the disclosure improve the determining of the CSI reference resource position. The greater a time interval between the CSI reference resource position and report, the lower the complexity of the terminal, and for some situations requiring high calculation complexity, it is needed to lower this requirement, but it does not mean that the time interval needs to be increased anytime. It is needed to avoid some cases where increasing the time interval may cause the significant performance loss; and in some cases, actually the UE does not face much calculation pressure on channel measurement and quantization, so it is needed to make a distinction among the cases.

Those of ordinary skill in the art should understand that the technical solutions of the disclosure can be modified or replaced equivalently without departing from their spirit and scope; and these modifications and equivalent replacements shall fall within the scope of claims of the disclosure.

Those ordinary skilled in the art may understand that all or some of the steps in the above method disclosed, the system, the functional modules/units in the device may be implemented as software, firmware, hardware and a proper combination of them. According to an embodiment of hardware, the division among the functional modules/units mentioned in the above description does not necessarily correspond to the division of physical units; for example, a physical component may have multiple functions, or a function or step may be performed by several physical components in coordination. Some or all of the components may be implemented as software performed a processor, for example, a digital signal processor or a microprocessor, or implemented as hardware, or implemented as an integrated circuit, for example, an application-specific integrated circuit. Such software may be distributed on computer readable media. The computer readable media may include computer storage media (or non-temporary media) and communication media (or temporary media). As those ordinary skilled in the art know, the term computer storage media include volatile and non-volatile media, and removable and un-removable media which are implemented in any method or technology for storing information (such as a computer readable instruction, a data structure, a program module or other data). The computer storage media include, but not limited to, an RAM, an ROM, an EEPROM, a flash memory or other memory technologies, a CD-ROM, a Digital Video Disk (DVD) or other optical storage, a cartridge, a tape, a disk storage or other magnetic storage devices, or any other media which may be used for storing expected information and may be accessed by a computer. Moreover, as those ordinary skilled in the art know, the communication media generally include the computer readable instruction, the data structure, the program module or other data, such as carriers or other transmission mechanisms, in a modulation data signal, and may include any information delivery media.

INDUSTRIAL APPLICABILITY

The solution provided by the disclosure achieves an optimal tradeoff between the performance loss and complexity according to the current conditions; through the solution, there is no significant performance loss while a benefit of complexity reduction is obtained, and the complexity of terminal is reduced, thereby reducing the cost of the terminal indirectly.

The invention claimed is:

1. A method for reducing complexity of channel quantization, the method being applied to a terminal and comprising:

determining a Channel State Information (CSI) report time-domain position and a time interval requirement parameter for a CSI reference resource time-domain position according to whether a measurement feedback parameter configured by a CSI process satisfies a first predetermined condition, or determining a CSI trigger time-domain position and an interval condition requirement parameter for the CSI reference resource time-domain position according to whether the measurement feedback parameter configured by the CSI process satisfies a second predetermined condition;

determining the CSI reference resource time-domain position according to the determined time interval requirement parameter and CSI report time-domain position, or determining the CSI reference resource time-domain position according to the determined interval condition requirement parameter and CSI trigger time-domain position; and performing CSI quantization according to the determined CSI reference resource time-domain position, wherein the predetermined conditions comprise one of the following:

a CSI feedback mode configured by the CSI process belongs to a set of CSI feedback modes;

a codebook parameter configured by the CSI process belongs to a set of codebook parameters;

a total number of ports for measuring a pilot configured by the CSI process belongs to a set of numbers of ports; or a number of pilots configured by the CSI process belongs to a set of numbers of pilots.

2. The method according to claim 1, after the CSI quantization is performed, further comprising: feeding back the quantized CSI.

3. The method according to claim 1, before determining the time interval requirement parameter or determining the interval condition requirement parameter, further comprising:

according to a capability level of the terminal, or a duplex mode, or a frame structure type, or Precoding Matrix Indicator (PMI) enabling signaling, or a configured transmission mode, or a number of configured processes, or a number of triggered processes, or a configured feedback class, determining one of the following:

a CSI feedback mode comprised in the set of CSI feedback modes;

a codebook parameter comprised in the set of codebook parameters;
a number of ports comprised in the set of the numbers of ports; or
a number of pilots comprised in the set of the numbers of pilots.

4. The method according to claim 3, wherein when a plurality of processes are configured or triggered, the set of the numbers of ports is a union of the sets of the total number of ports for measuring the pilot corresponding to the plurality of processes.

5. The method according to claim 3, wherein when a plurality of processes are configured or triggered, the set of the numbers of pilots is a union of the sets of the number of pilots corresponding to the plurality of processes.

6. The method according to claim 1, wherein when the configured number of pilots is less than 4, the time interval requirement parameter is x; and when the configured number of pilots is greater than or equal to 4, the time interval requirement parameter is y, wherein x and y are integers, and y is greater than x.

7. A device for reducing complexity of channel quantization, which is set in a terminal, comprising a processor, a memory, and one or more modules stored on the memory and executable by the processor, the one or more modules comprising:
a first determining module configured to: determine a Channel State Information (CSI) report time-domain position and a time interval requirement parameter for a CSI reference resource time-domain position according to whether a measurement feedback parameter configured by a CSI process satisfies a first predetermined condition, or determine a CSI trigger time-domain position and an interval condition requirement parameter for the CSI reference resource time-domain position according to whether the measurement feedback parameter configured by the CSI process satisfies a second predetermined condition;
a second determining module configured to: determine the CSI reference resource time-domain position according to the determined time interval requirement parameter and CSI report time-domain position, or determine the CSI reference resource time-domain position according to the determined interval condition requirement parameter and CSI trigger time-domain position; and
a quantization module configured to: perform CSI quantization according to the determined CSI reference resource time-domain position,
wherein the predetermined conditions comprise one of the following:
a CSI feedback mode configured by the CSI process belongs to a set of CSI feedback modes;
a codebook parameter configured by the CSI process belongs to a set of codebook parameters;
a total number of ports for measuring a pilot configured by the CSI process belongs to a set of numbers of ports; or
a number of pilots configured by the CSI process belongs to a set of numbers of pilots.

8. The device according to claim 7, the one or more modules further comprising: a feedback module configured to feed back the quantized CSI.

9. The device according to claim 7, the one or more modules further comprising a setting module configured to determine, according to a capability level of the terminal, or a duplex mode, or a frame structure type, or Precoding Matrix Indicator (PMI) enabling signaling, or a configured transmission mode, or a number of configured processes, or a number of triggered processes, or a configured feedback class, one of the following:
a CSI feedback mode comprised in the set of CSI feedback modes;
a codebook parameter comprised in the set of codebook parameters;
a number of ports comprised in the set of the numbers of ports; or
a number of pilots comprised in the set of the numbers of pilots.

10. The device according to claim 9, wherein the setting module is further configured to, when a plurality of processes are configured or triggered, determine that the set of the numbers of ports is a union of the sets of the total number of ports for measuring the pilot corresponding to the plurality of processes.

11. The device according to claim 9, wherein the setting module is further configured to, when a plurality of processes are configured or triggered, determine that the set of the numbers of pilots is a union of the sets of the number of pilots corresponding to the plurality of processes.

12. A non-transitory computer readable storage medium, in which computable executable instructions are stored; the computable executable instructions are used for performing a method for reducing complexity of channel quantization, the method comprising:
determining a Channel State Information (CSI) report time-domain position and a time interval requirement parameter for a CSI reference resource time-domain position according to whether a measurement feedback parameter configured by a CSI process satisfies a first predetermined condition, or determining a CSI trigger time-domain position and an interval condition requirement parameter for the CSI reference resource time-domain position according to whether the measurement feedback parameter configured by the CSI process satisfies a second predetermined condition;
determining the CSI reference resource time-domain position according to the determined time interval requirement parameter and CSI report time-domain position, or determining the CSI reference resource time-domain position according to the determined interval condition requirement parameter and CSI trigger time-domain position; and
performing CSI quantization according to the determined CSI reference resource time-domain position,
wherein the predetermined conditions comprise one of the following:
a CSI feedback mode configured by the CSI process belongs to a set of CSI feedback modes;
a codebook parameter configured by the CSI process belongs to a set of codebook parameters;
a total number of ports for measuring a pilot configured by the CSI process belongs to a set of numbers of ports; or
a number of pilots configured by the CSI process belongs to a set of numbers of pilots.

13. The non-transitory computer readable storage medium according to claim 12, wherein after the CSI quantization is performed, the method further comprises: feeding back the quantized CSI.

14. The non-transitory computer readable storage medium according to claim 12, wherein before determining the time interval requirement parameter or determining the interval condition requirement parameter, the method further comprises:

according to a capability level of a terminal, or a duplex mode, or a frame structure type, or Precoding Matrix Indicator (PMI) enabling signaling, or a configured transmission mode, or a number of configured processes, or a number of triggered processes, or a configured feedback class, determining one of the following:
- a CSI feedback mode comprised in the set of CSI feedback modes;
- a codebook parameter comprised in the set of codebook parameters;
- a number of ports comprised in the set of the numbers of ports; or
- a number of pilots comprised in the set of the numbers of pilots.

15. The non-transitory computer readable storage medium according to claim 14, wherein when a plurality of processes are configured or triggered, the set of the numbers of ports is a union of the sets of the total number of ports for measuring the pilot corresponding to the plurality of processes.

16. The non-transitory computer readable storage medium according to claim 14, wherein when a plurality of processes are configured or triggered, the set of the numbers of pilots is a union of the sets of the number of pilots corresponding to the plurality of processes.

17. The non-transitory computer readable storage medium according to claim 12, wherein when the configured number of pilots is less than 4, the time interval requirement parameter is x; and when the configured number of pilots is greater than or equal to 4, the time interval requirement parameter is y, wherein x and y are integers, and y is greater than x.

* * * * *